United States Patent [19]

Stiebel

[11] 3,757,418

[45] Sept. 11, 1973

[54] DIGITAL FOOT MEASURING INSTRUMENT

[75] Inventor: Ariel Stiebel, Bloomfield Hills, Mich.

[73] Assignee: Radex Corporation, Detroit, Mich.

[22] Filed: Apr. 14, 1971

[21] Appl. No.: 133,825

[52] U.S. Cl. .................................................. 33/3 C
[51] Int. Cl. ............................................. A43d 1/02
[58] Field of Search ...................... 33/3 R, 3 A, 3 B, 33/3 C

[56] References Cited
UNITED STATES PATENTS

| | | | |
|---|---|---|---|
| 3,494,036 | 2/1970 | Stibel et al. | 33/3 C |
| 2,554,285 | 5/1951 | Westbrook | 33/3 C |
| 802,448 | 10/1905 | Goodbar | 33/3 C |

Primary Examiner—Louis R. Prince
Assistant Examiner—Charles E. Phillips
Attorney—Hauke, Gifford and Patalidis

[57] ABSTRACT

A device for measuring and exhibiting the shoe size corresponding to the length and width of a human foot which comprises a first slide adapted to be placed in alignment with the toe end of the foot and a second slide associated with the first slide and adapted to be placed in alignment with the ball of the foot. Each of the two slides has fixed to it a different scalar shoe size chart. A pair of apertures are positioned above the charts to exhibit a pair of shoe sizes as they are registered on the charts in the final moved position of the slides with the larger size indicating the appropriate shoe length size. A separate width determining slide is operatively associated and cooperable with both the aforesaid slides to provide the proper lateral movement of the two charts providing the appropriate shoe width size.

9 Claims, 8 Drawing Figures

INVENTOR
ARIEL STIEBEL
BY Hauke, Gifford & Patalides
ATTORNEYS

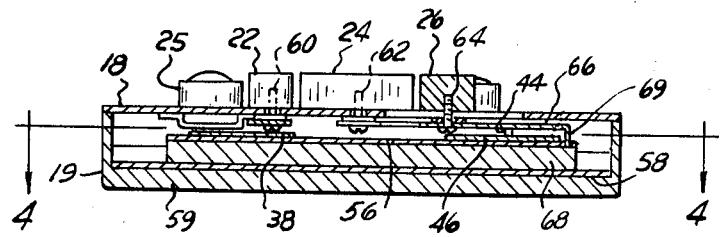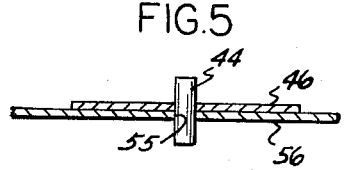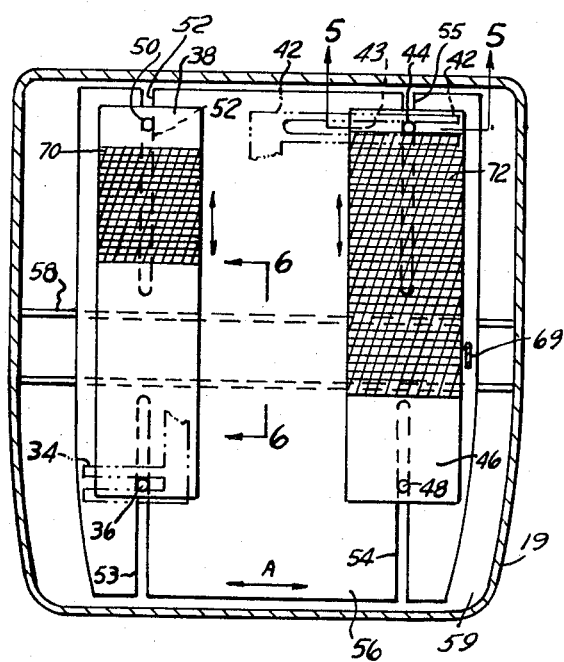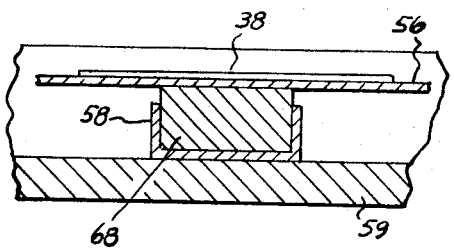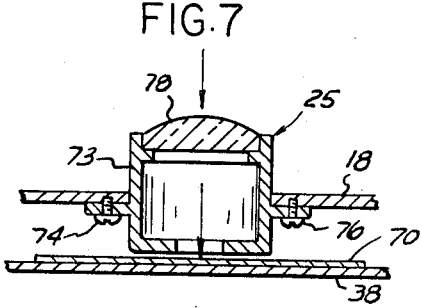

FIG. 8

DIGITAL FOOT MEASURING INSTRUMENT

CROSS REFERENCE TO RELATED PATENT

Reference is made to U.S. Pat. No. 3,494,036 issued Feb. 10, 1970 to Ariel Stiebel and Seymour A. Lippmann for "Digital Foot Measuring Instrument." This patent is of common ownership with the instant application.

BACKGROUND OF THE INVENTION

The present invention relates to foot measuring instruments in general and, more particularly, to a digital type shoe size readout apparatus combined with a foot measuring instrument of relatively simple construction and reliable mode of operation. Prior art foot measuring devices for the purpose of determining and exhibiting shoe size preparatory to the fitting of shoes generally consist of manually operated and positioned gaging apparatus. Usually one slide is utilized to measure the overall length of the foot and another slide is utilized to measure the width of the foot. The accuracy of any such devices is questionable, and the operation thereof requires a certain amount of skill and training on the part of the user in order to make proper manipulation of the slides and then to interpret and read out correctly the shoe size indicated by the device.

The more complex prior art foot measuring devices operate by providing an apparatus giving separate visual displays of the length and of the width of the foot. Such devices do not take into account the problems of the non-standard foot in which the arch length, the distance measured from heel to ball of the foot, does not fall within the "normal foot" range. The complexity of design of the known devices frequently arises from an attempt to measure and to compensate for the greater shoe length required in that portion of the population having an oversize arch length.

A still further complicating factor is that the shoe width classification required for a given foot is determined not only by the actual maximum foot width but by the foot length involved. Thus, each of the commonly used foot width classifications, AAA, AA, A, B, C, D, E, does not indicate a fixed shoe width. For example, the shoe width classification B represents a wider shoe and greater foot width for a length size 10 than it does for a length size 8. A relatively large number of combinations of foot lengths and width sizes must thus be interrelated by the measuring and indicating equipment involved. This has served to greatly enlarge the expense and increase the complexity of the mechanical and electronic equipment incorporated in prior art measuring devices.

SUMMARY OF THE INVENTION

The present invention is one in which the shoe size indicating device takes into account all the significant problems involved in foot measurement and particularly compensates for the arch length and foot length characteristics involved. A mechanically operated device is provided which needs no power connections, is capable of giving forth an alpha numeric readout of a digital type and requires little or no skill on the part of the person operating the device. Of the two shoe size readout displays furnished, it is only required that the reader of the device select and use the larger when there is a difference in magnitude between the two.

BRIEF DESCRIPTION OF THE DRAWINGS

A preferred form of the invention is illustrated in the drawings accompanying and forming part of this specification. Like numerals are applied to identical parts of the apparatus as they are shown in the different views. In the drawings:

FIG. 3 is a sectional view taken along the section line 3—3 of FIG. 2;

FIG. 4 is a sectional view taken along the section line 4—4 of FIG. 3 with parts broken away;

FIG. 5 is a sectional view of a portion of the FIG. 4 apparatus taken along the section line 5—5;

FIG. 6 is a sectional view of the FIG. 4 apparatus taken along the section line 6—6;

FIG. 7 is a partial sectional view illustrating one of the viewing apertures provided in the cover of the measuring instrument; and FIG. 8 is a showing of one of the shoe size charts used in conjunction with the measuring device.

DETAILED DESCRIPTION OF THE INVENTION

Figure 1:
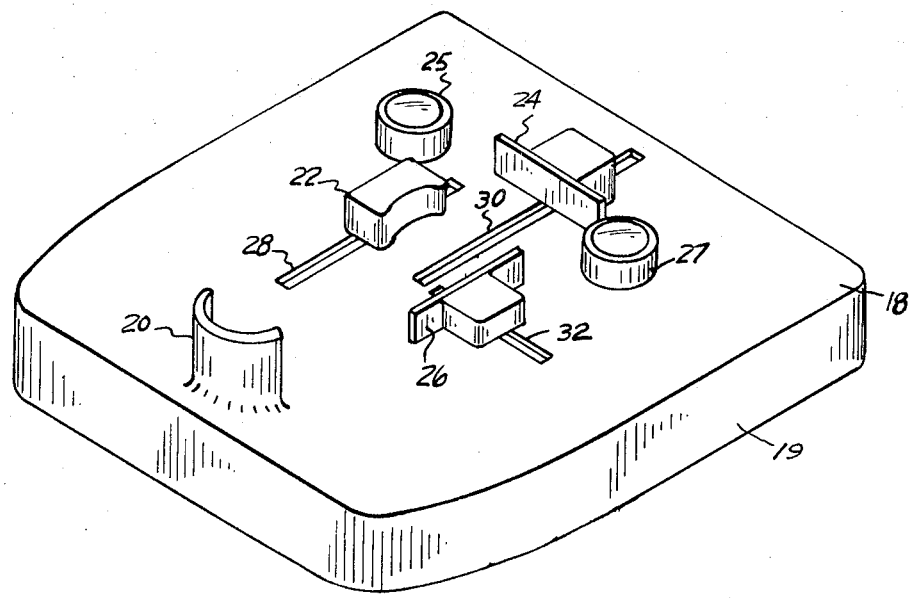
FIG. 1 is a perspective view of the foot measuring instrument.

FIG. 1 shows the externally located operating elements of the measuring instrument which include a stationary heel rest 20 mounted on a cover plate 18 for a housing 19, a foot ball engaging plate 22 and a large toe engaging plate 24. Also included is a width measuring plate 26 engageable with the right side of the foot being measured. A plurality of rectangular slots 28, 30 and 32 are formed in the cover plate 18. It will be noted that the ball engaging plate 22 is longitudinally movable in the slot 28. The toe engaging plate 24 is similarly longitudinally movable in the slot 30. The width measuring plate 26 is laterally movable in the transverse slot 32. A pair of viewing apertures 25 and 27 are further provided in the cover plate 18.

Figure 2:
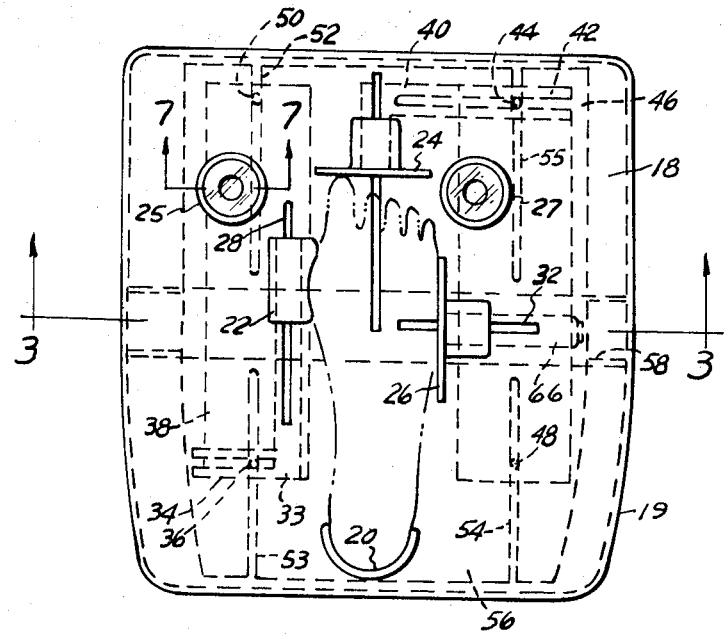
FIG. 2 is a top plan view of the device showing the outline of a foot which has been placed in measuring position and showing in dash lines the relative moved position of certain basic operating elements.

In FIG. 2, the outline of a right foot is shown in a foot measuring position with the heel in abutment with the heel rest 20. The ball engaging plate 22 has been moved differentially in the slot 28 to a position where it engages the ball of the foot and according to its longitudinal displacement has been given a position according to the arch length of the foot. The toe engaging plate 24 is shown in engagement with the large toe of the foot and is moved to a position indicating overall foot length. At the same time, the width plate 26 has been moved rightwardly in the associated slot 32 to provide a foot width indication.

The ball engaging plate 22 further has fixed to its lower end a bifurcated drive member 32 which includes at its lower end a transverse slot 34. The slot 34 is in driving engagement with a pin 36. The pin 36 is affixed to a longitudinally movable slide 38 projecting above and below the slide. According to the longitudinal positioning of the ball engaging plate 22, the slide 38 is also longitudinally positioned. As it will be shown hereinafter, particularly in FIG. 4, the slide 38 supports a shoe size shart 70 which chart is itself moved and positioned relative to the viewing aperture 25 to provide a digital readout indication of length.

With respect to the overall length measurement, the toe engaging plate 24 has connected at its lower end a drive member 40 having a bifurcated end portion 42 extending transversely and provided with a slot 43 engaged by a pin 44. The pin 44 is affixed to a second slide 46, projecting above and below the slide. The slide 46 is likewise movable longitudinally in accordance with the overall foot size and to indicate the appropriate shoe size through the positioning of a second chart 72 carried by the slide 46 and positioned relative to the right hand viewing aperture 27. A second downwardly projecting pin 48 is fixed to the opposite end of the slide 46 to provide a guide for the longitudinal movement of the slide 46. In a like manner, it will be seen that a second downwardly projecting pin 50 is connected to the forward end of the slide 38 to provide a guide for the longitudinal movement of the slide 38. A transversely slidable support plate 56 is positioned under slides 38 and 46. The support plate has longitudinal slots 52, 53 and 54, 55 for accepting the downward projecting portions of the pins 50, 36 and 48, 44 and therefore providing for the straight line, longitudinal movement of the associated slides 38 and 46. As will be made more clear from FIGS. 3 and 4 and 6 hereinafter, the support plate 56 is itself movable laterally to provide a sidewise movement of the two chart carrying slides 38 and 46. To provide this lateral movement, a cross channel 58 is provided fastened to the base 59 of the housing. Slidably movable in channel 58 is a rail member 68 the upper surface of which has fixed to it the support slide 56.

With reference to FIG. 3, the connection is shown between the plate 26 and the laterally movable support plate 56. The two chart supporting slides 38 and 46 are shown in the position in which they are mounted relative to support plate 56.

In FIG. 3, a threaded fastener 60 is shown which is used to connect the ball engaging plate 22 to the bifurcated drive member 34 for the chart carrying slide 38. A threaded fastener 62 is shown which is used to connect the toe engaging plate 24 with the bifurcated drive member 42 which in turn serves to position the chart carrying slide 46. The means for providing a width indicating movement of the chart carrying slides 38 and 46 includes a screw 64 which connects the plate 26 to an arm 66. The arm 66 extends rightwardly and includes a downward depending lug 69 connected to the right hand end of the support plate 56.

FIG. 4 shows the general arrangement of the internal parts with the cover plate 18 and its associated structure removed. The direction of movement laterally of the support plate 56 is indicated by arrows A. The ball length related shoe size chart 70 is shown as it is mounted on the left hand slide 38. A second overall length related shoe size chart 72 is shown mounted on the right hand slide 46. It will be seen that the ball length chart 70 is to a reduced scale longitudinally as compared to the overall length chart 72. The purpose and significance of this sizing difference of the charts will be clarified in the section "Description of Operation" hereinafter.

FIG. 5 shows the manner in which the pin 44 is related to the slide 46 and to the laterally movable support plate 56. It will be recognized that slide 46 is movable longitudinally across the upper surface of support base 56. Support base 56 when moved laterally also drives the chart supporting plate 46 in a lateral direction through its abutment with pin 44.

FIG. 7 shows the detail of one of the viewing apertures 25 which provides a digital type readout responsive to the positioning of the corresponding chart, in this case the ball length chart 70. Included is a barrel 73 extending through an opening formed in cover plate 18. The barrel 73 is held in place by a pair of screws 74 and 76. A magnifying lens 78 is mounted at the upper end of the barrel 78.

Figure 8:
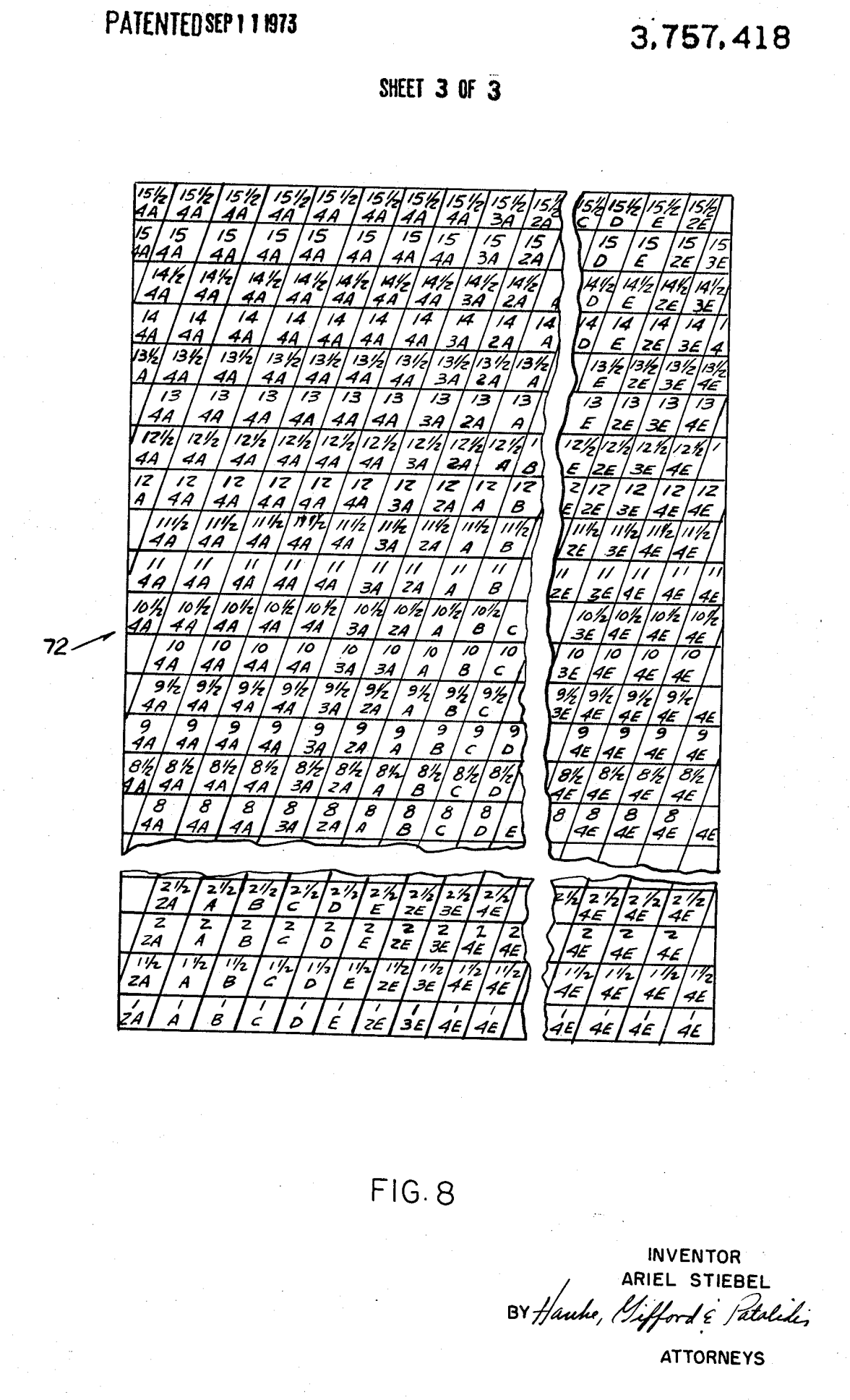

FIG. 8 shows one of the two shoe size charts as they are utilized in the present invention. The chart 72 which is fixed to the overall length indicating slide 46 is shown. It will be understood that the chart 70 which is attached during operation to the longitudinally movable slide 38 will be identical with chart 72 with regard to its length and width data except that the longitudinal overall length of the chart will be reduced as compared to that of the chart 72. Otherwise stated, the width of the chart 70 will be the same as that of the chart 72 but it will be reduced in overall length in a predetermined ratio to provide for the variance in width with respect to overall length. As already has been indicated by way of example, the width B for a length size 10 will be somewhat greater than the width B for a length size 8.

DESCRIPTION OF OPERATION

The foot to be measured is placed with the heel against the stationary rest 20. The ball engaging slide 22 is moved longitudinally so that it rests against the ball of the foot. At the same time the bifurcated drive means 34 drives the slide 38 forwardly and positions the chart 70 carried on that slide to a position which exposes one of the shoe size indicia printed thereon through the aperture 25. The toe engaging plate 24 is moved to a position in engagement with the large toe of the foot. This causes movement by the operation of the bifurcated drive member 42 against the pin 44 to move the slide 46 forwardly along with the overall length chart 72 carried thereon. This likewise will position one of the shoe size indicia beneath the opening provided by aperture 27. At the same time, there will be a rightward movement of the foot width plate 26 which will result in sidewise positioning of the support plate 56 and consequently of the two chart carrying slides 46 and 38. The pin and slot drive furnished through the several intermediate elements thus laterally positions both charts 70 and 72 to a width indicating position. There is now provided an alpha numeric output at both apertures which indicates the length and width of shoe size. As has previously been discussed, it is necessary to correlate the ball length, i.e., the arch size of the foot to the overall foot length. This is done by the relative sizing of the two charts 70 and 72 and by their positioning as has hereinbefore been described. Wherever there is indicated a difference in the two chart readings as viewed through apertures 25 and 27, the reader or person operating the measuring instrument need only select the larger of the two digits. This will properly compensate for the arch length characteristic which might be present in the wearer's foot. The measuring instrument will compensate for the situation where the arch length is longer than average when the next higher half or full length size is required to fit the foot despite the overall length and the width measurement.

It will further be understood that shoe sizing differs as between different shoe manufacturers. Shoe sizing systems also are different as in countries such as the United States and Canada as compared to European countries which use entirely different sizing systems of the metric type. It is possible through reducing these size arrangements to the appropriate charts similar in relative sizing and arrangement to charts 70 and 72 to adapt the instrument to operate according to any existing sizing system. The instrument of the present invention is readily adaptable to changeover for measurement between different class sizes such as those for men, women or children. It is only necessary that the appropriate pairs of preprinted charts be inserted on the slides to place the instrument in condition for operation for measuring the shoe size of one of such classes.

An instrument according to this invention can be used by a customer in a self-serve store. The operation of the measuring device can be readily apparent with a minimum of printed instruction.

What is claimed is:

1. An instrument for determining and exhibiting a shoe size for a foot comprising a housing, a cover for said housing, a stationary abutment on said cover for engagement with the heel of said foot, a longitudinally movable ball engageable abutment, a longitudinally movable toe engagement abutment, a transversely movable abutment engageable with the outer side of said foot, said movable abutments being disposed for linear motions above said cover, a support plate disposed below said cover supported and guided by the bottom of said housing and transversely movable by said foot side engageable abutment, a pair of longitudinally movable slides supported and guided by said support plate, one of said slides being longitudinally movable by said toe engageable abutment and the other by said ball engageable abutment, a chart having shoe size increments of increasing length along its longitudinal axis and shoe size increments of increasing width along its transverse axis affixed to each slide, both of said charts having equal transverse scales and one of said charts having a compressed longitudinal scale relative to the other and being affixed to the slide movable by the ball engageable abutment, and a pair of viewing and sighting apertures disposed through said cover, each for viewing a single shoe length and width increment of a respective one of said charts when said instrument is operated with the respective abutments in engagement with a foot to provide a pair of shoe size readouts, the larger of which represents the proper shoe size for said foot.

2. The instrument of claim 1 wherein a drive means is connected to each of said slides for moving said slide and its associated chart in a longitudinal direction and further permitting a transverse movement proportional to the amount of displacement of said transversely movable support plate.

3. The instrument of claim 2 wherein said drive means is a member fastened to the longitudinally movable abutment, said member having a transverse slot engaged by a pin projecting from said slide for driving said slide longitudinally while permitting transverse motion of said slide as a result of transverse motion of said support plate.

4. The instrument of claim 1 wherein said transversely movable support plate is provided with two pairs of aligned slots and wherein each of said longitudinally movable slides has a pair of pin members each projecting in one of said slots in said support plate.

5. The instrument of claim 1 wherein said charts are according to a predetermined shoe size system and interchangeable with charts according to a different shoe size system.

6. An instrument for determining and exhibiting a shoe size comprising a housing, a cover for said housing, a stationary heel engaging plate and a plurality of dimension gaging elements mounted on said cover for manual longitudinal and transverse translation into engagement with a foot comprising a width gaging element, a pair of length gaging elements, one of which is a toe engaging overall foot length measuring element and the other of which is a ball engaging arch length measuring element, a first slide member mechanically translated along a longitudinal axis by said overall length gaging elements, a second slide member mechanically translated along a longitudinal axis by said arch length measuring element, a support plate for said slide members mechanically translated along a transverse axis by said width gaging element, said slide members and support plate being disposed in said housing below said cover, said support plate being mounted on the bottom of said housing for transverse motion relative to said housing and said slide members being mounted on said support plate for longitudinal motion relative to said support plate, a pair of similar charts bearing shoe size indicia of progressively increasing length along the longitudinal axis of said charts and progressively increasing shoe width along the transverse axis of said charts each disposed on one of said slide mambers, the chart disposed on said first slide member being at the same transverse scale as the chart disposed on said second slide member and at a larger longitudinal scale than said chart on said second slide member, and a pair of viewing and sighting apertures through said cover each for viewing a single shoe size indicium on each chart dependent upon the position of said chart relative to its corresponding viewing and sighting aperture for providing a pair of shoe sizes, the larger of which represents the proper shoe size for said foot.

7. The instrument of claim 6 wherein said support plate is provided with a transverse disposed rail member slidably engaged in a crossway channel on the bottom of said housing.

8. The instrument of claim 7 wherein each of said slide members is provided with a pair of longitudinally spaced pins projecting in aligned slots disposed in said support plate.

9. The instrument of claim 8 wherein said width and length gaging elements are movable abutments each positionable along a slot formed in said cover, and said overall length measuring element and said arch length measuring element are coupled respectively to said first and second slide members by means of a drive member having a transverse slot engaged by a pin dependent from the respective slide member.

* * * * *

RAC-103-A-2 UNITED STATES PATENT OFFICE
CERTIFICATE OF CORRECTION

Patent No. 3,757,418          Dated September 11, 1973

Inventor(s) ARIEL I. STIEBEL ET AL

It is certified that error appears in the above-identified patent and that said Letters Patent are hereby corrected as shown below:

IN THE REFERENCES CITED

In Patent No. 3,494,036, change "Stibel" to -- Stiebel --

IN THE SPECIFICATION

Column 1, line 17, change "size" to -- sizes --

Column 2, line 57, change "32" to -- 33 -- line 65, change "shart" to -- chart --

IN THE CLAIMS

Column 6, line 36, change "mambers" to -- members --

Signed and sealed this 29th day of January 1974.

(SEAL)
Attest:

EDWARD M. FLETCHER, JR.
Attesting Officer

RENE D. TEGTMEYER
Acting Commissioner of Patents